Dec. 1, 1942.    G. B. CHRISTENSEN    2,303,988
TRANSPARENCY DISPLAYING DEVICE
Filed Nov. 4, 1940    2 Sheets-Sheet 1
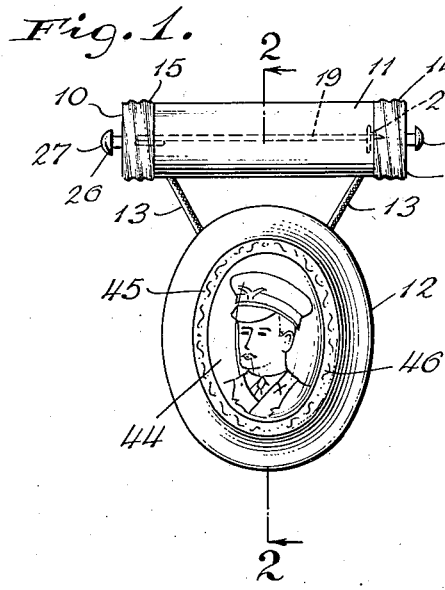
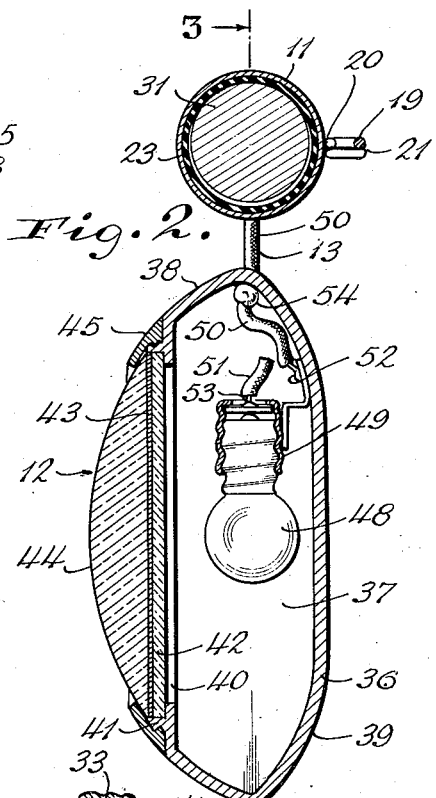
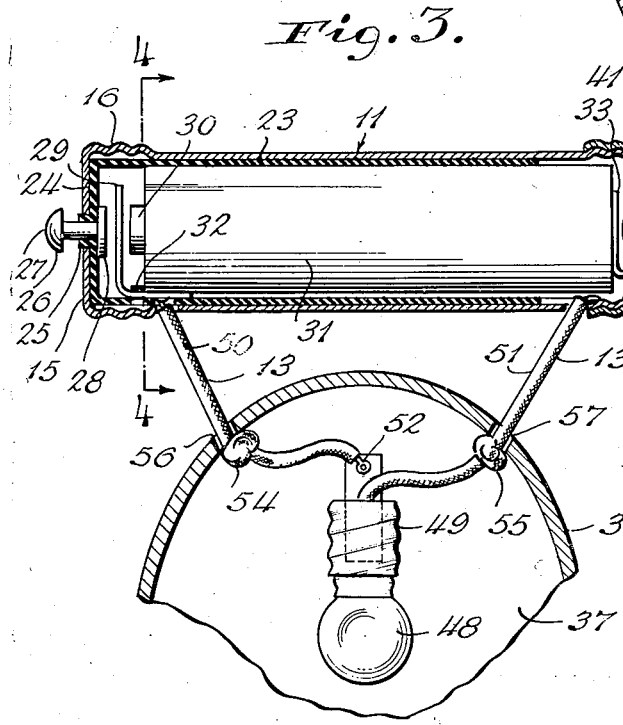
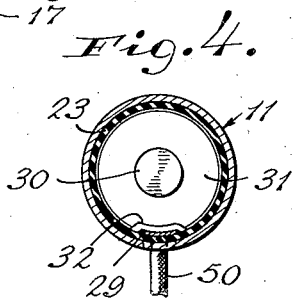
INVENTOR.
GENEVA BANDY CHRISTENSEN
BY
ATTORNEY Dec. 1, 1942.    G. B. CHRISTENSEN    2,303,988
TRANSPARENCY DISPLAYING DEVICE
Filed Nov. 4, 1940    2 Sheets-Sheet 2
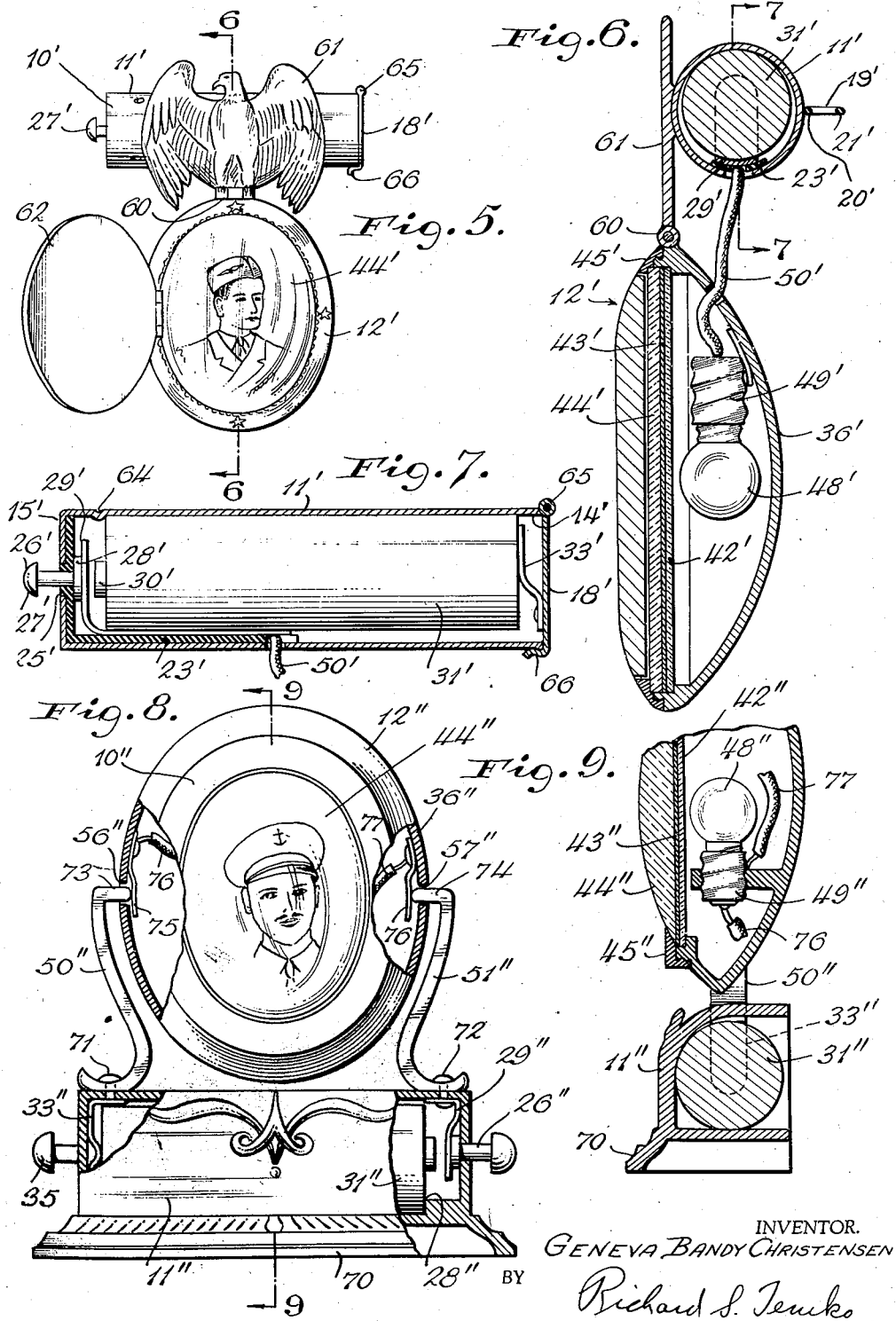
INVENTOR.
GENEVA BANDY CHRISTENSEN
BY Richard S. Jenks
ATTORNEY Patented Dec. 1, 1942

2,303,988

UNITED STATES PATENT OFFICE 2,303,988

TRANSPARENCY DISPLAYING DEVICE

Geneva Bandy Christensen, New Rochelle, N. Y.

Application November 4, 1940, Serial No. 364,299

1 Claim. (Cl. 40—130)

This invention relates generally to devices for the display of mediums of a transparent or a translucent nature by illumination means in association therewith, and more particularly to an illuminated device for the display of transparencies, said device being especially adapted for personal use.

With the advent of certain improvements in the photographic art, means have been provided for the rapid and inexpensive production of photographic transparencies in full color. By reason of certain inherent qualities of such photographic mediums, as for example, such as are currently sold under the trade-mark "Kodachrome," in order to obtain a proper visual effect therefrom, it is necessary to view them either after they have been projected upon a screen or by means of transmitted light.

This condition has therefore restricted the general use of such transparencies by reason of the fact that it is necessary for the user to carry with him a projection device or in displaying the transparencies, it is necessary to find a source of light which is of the proper intensity and uniformity.

In accordance with the present invention, such disadvantages are overcome in the provision of a self contained unit which includes not only the transparency itself, but also light diffusing and reflecting mediums, a source of illumination, power for said illumination source, and in some forms magnifying means for enlarging the view of the transparency.

Since in order to be produced economically, and therefore capable of large-scale production, the device must be relatively simple in construction, certain improvements in mechanical construction have been introduced. These mechanical improvements not only permit easier, quicker, and cheaper fabrication, but also add to the appearance of the device, and its use when worn.

Among the objects of the present invention lies the provision of transparency exhibiting structure wherein independent means is provided for containing the source of electricity, yet said means is articulately connected to the illumination source and transparency containing unit.

Another object herein lies in the provision of structure of the class described wherein the power source container serves as a base which supports the illumination source and transparency containing unit so that said unit is movable and adjustable with relation to the container for the power source.

Another object herein lies in the provision of a transparency viewing structure in which the power source container may have interchangeably and adjustably connected thereto, in turn, a plurality of illumination source and transparency containing units.

Another object herein lies in the provision of means whereby the device may be detachably attachable to the garment of the user, so that although attached to the garment, the illumination and picture unit may be moved so as to be visible by both the wearer as well as other persons.

These objects and other incidental ends and advantages will more fully appear in the progress of this disclosure and be pointed out in the appended claims.

In the drawings constituting a material part hereof, similar reference characters designate corresponding parts throughout the several views in which:

Figure 1 is a front elevational view of the first embodiment of the invention.

Figure 2 is an enlarged central vertical sectional view as seen from the plane 2—2 of Figure 1.

Figure 3 is a fragmentary vertical sectional view as seen from the plane 3—3 on Figure 2.

Figure 4 is a fragmentary vertical sectional view as seen from the plane 4—4 on Figure 3.

Figure 5 is a front elevational view taken similarly to Figure 1, showing a second embodiment of the invention.

Figure 6 is an enlarged vertical sectional view as seen from the plane 6—6 on Figure 5.

Figure 7 is a fragmentary vertical sectional view as seen from the plane 7—7 on Figure 6.

Figure 8 is a front elevational view in elevation of a third embodiment of the invention, certain of the parts being broken away for the purpose of clarity.

Figure 9 is a fragmentary vertical sectional view as seen from the plane 9—9 on Figure 8.

Turning now to the first embodiment of the invention illustrated in Figures 1 to 4 inclusive, the transparency displaying and illuminating device illustrated generally by numeral 10, comprises broadly a power source container 11, a transparency displaying unit 12, and conducting and suspending means 13. The container 11 is preferably in the form of a hollow cylinder having an open end 14, and a closed end 15. The container 10 may be composed of a suitably drawn metal shell having the threaded portions 16 and 17, and the cap 18 adapted for detachable engagement with the threaded portion 17. The threaded portion 16 is expanded in diameter so as to provide a symmetrical appearance at both ends of the container 11. Affixed to the rear surface of the container 11, as viewed in Figure 1, is a garment attaching means 19. The garment attaching means may be in the form of a type of safety pin in which the stationary bar 20 is affixed to the rear surface of the container 11, and the pointed bar 21 is adapted to engage the guard ring 22. The means 19 may be formed from spring wire, preferably of steel, brass or phosphor-bronze. The container 11 has disposed therewithin an insulating cylinder 23 which is substantially cup-shaped and has a closed end 24. The external diameter of the insulating cylinder 23 is equal to or slightly less than the internal diameter of the container 11. The closed end 24 is provided with an outwardly extruded short sleeve 25 which is adapted to project through an opening in the closed end 15. A push button 26 may be made of either insulating or conducting material and the same is slidably mounted within the sleeve 25. The push button 26 may be formed with a convex head 27 and a disk portion 28. The disk portion 28 is adapted in the innermost position thereof to move the contactor 29 toward the positive pole 30 of a dry cell 31, disposed within the insulating cylinder 23.

The contactor 29 is preferably substantially an L-shaped piece of resilient conducting material, the horizontal portion of the L being secured between adjacent portions of the insulating cylinder 23, which have been deformed for this purpose. This construction is best seen in Figures 3 and 4 in which a web of the insulating material which forms the cylinder 23 is deformed inwardly thereof to form an open pocket into which the contactor 29 is secured.

The dry cell 31 may be of the usual construction, as for example, the size currently used wtihin small illuminating devices, such as illuminated pencils, tongue depressors, etc. The external diameter of the dry cell 31 is substantially equal to or less than the distance between the upper portion of the insulating cylinder 23 as seen in Figure 3 and the lower portion of the L-shaped contactor 29. The web 32 serves as a stop to prevent undesirable movement of the dry cell 31 toward the contactor 29. The cap 18 has secured to the inner surface thereof a U-shaped contactor 33, composed of any suitable resilient conducting material. The outer arm of the contactor 33 is secured to the inner surface of the cap 18, preferably by means of a rivet 34. The exposed shank of the rivet and the dome-shaped head 35 are proportioned so as to provide a symmetrical appearance with the push button 26 having the convex head 27. The inner arm of the U-shaped contactor 33 is adapted to resiliently contact the bottom of the dry cell 31, or the right-hand end thereof as seen in Figure 3. The dry cell 31 is provided with the usual sleeve made of cardboard or similar material which prevents contact between the zinc shell of the dry cell and the lower portion of the contactor 29.

It may thus be seen that by unscrewing the cap 18 of the dry cell 31 may be readily replaced upon the exhaustion thereof.

The transparency displaying unit 12 includes a casing 36 which may be of any desired configuration, but preferably of an oval shape as illustrated in Figures 1 to 3 inclusive. The formation of the casing 36 is such as to provide a lamp chamber 37 having a front wall 38 and a rear wall 39. The front wall 38 is provided with an inwardly extending annular flange 40, and a forwardly extending annular flange 41. The combination of the flanges 40 and 41 serve as a seat for the diffusing screen 42, the transparency 43, and the magnifying cover lens 44. The detachable rim 45 may carry suitable decoration 46 and is adapted to detachably engage the outer surface of the flange 41 with a snap action. This operation is secured by means of corresponding projections and depressions being located on the opposed inner surfaces of the rim 45 and the flange 41. The rim in combination with the parts just described forms a bezel structure for maintaining the parts in place.

An electric bulb 48 is mounted in a suitable socket therefor 49, which is secured to the inner surface of the rear wall 39. This securing may be done in any suitable manner as for example by spot welding or soldering.

The bulb 48 is thus positioned directly behind the diffusing screen 42 which serves to spread the light from the bulb directly and from the adjacent surfaces which reflect said light, and to permit said light to pass through the transparency 43 which is presented in magnified form through the magnifying lens 44. The lens 44 also acts as a transparent cover which serves to protect the transparency 43. In order to improve the light producing qualities of the device, the inner surfaces of the front and rear walls 38 and 39 may be coated with a light reflecting medium, such as white enamel. These surfaces may, if desired, be plated or burnished for the same purpose.

The transparency displaying unit 12 receives its electrical energy and is supported by the combination conducting and suspending means 13. These means may be in the form of insulated wires or conductor supports 50 and 51. The upper terminal of the conductor support 50 is secured in any suitable manner, preferably by soldering to the lower portion of the contactor 29, the upper end of the conductor support 50 gaining access to said conductor through suitably disposed orifices in the container 11 and the insulating cylinder 23. This construction is seen in the lower left-hand portion of Figure 3. The lower portion of the conductor support 50 connects with the socket 49 at 52.

The upper portion of the conductor support 51 is suitably secured to the inner surface of the container 11 and gains access thereto through an opening in the container 11. The lower portion of the conductor support 51 engages the central contact of the socket 49 at the point 53.

In order to properly position the unit 12 with relation to the container 11, the supports 50 and 51 are provided with suitable enlargements 54 and 55. These enlargements in the case of insulated electrical conductors can be in the form of knots as seen in Figures 2 and 3. Where desired, however, suitable means may be clamped about the supports 50 and 51 to prevent the upward passage thereof through the orifices 56 and 57 in the casing 36. Since the casing 36 need not carry electrical energy, the same may, if desired, be made of an insulating material.

The operation of the first embodiment of the invention is as follows: Assuming the device to be assembled as shown in the drawings, the pointed bar 21 may be inserted in any desired garment and when the end thereof is placed within the guard ring 22, the entire device 10 is positively anchored against loss. Manual pressure on the convex head 27 will cause the disk 28 to move inwardly of the device thereby completing the circuit to the dry cell 31 as follows: The current will flow from the zinc of the dry cell 31 through the contactor 33, the cap 18, the container 11, the conductor support 51, the point 53, the bulb 48, the socket 49, the point 52, the conductor support 50, the contactor 29, to positive pole 30.

By reason of the fact that the display unit 12 is flexibly connected to the container 11, the same may be shifted about in various positions so that the wearer and others may see the transparency in proper full illumination. By reason of the nature of the transparencies of the type previously described, they appear to best advantage when viewed directly from in front, the direct rays of light serving to illuminate the transparency better than reflected rays of light, so that a directional effect is produced. This condition is also amplified by the action of the lens 44. By means of the action of the conductor supports 50 and 51 the display unit 12 may be moved in all directions without affecting the intensity and constancy of the illumination in the bulb 48.

Since the transparencies of the class described above are substantially an inch by an inch and a half in size, it will be seen that the entire device must be of a certain minimum bulk, and in accordance with applicant's novel construction, this bulk is so distributed that the dry cell container 11 and the display unit 12 are articulately connected to each other. This means that the whole device 10 contains a certain flexibility which makes it comfortable when worn on clothing since the parts may shift to accommodate the movements of the wearer.

Turning now to the second embodiment of the invention, illustrated in Figures 5 to 7 inclusive, parts corresponding generally to the first embodiment are given singly primed numerals for the purpose of avoiding needless repetition.

The second embodiment of the invention differs principally from the first embodiment of the invention in the fact that the transparency displaying unit 12' is supported from the power source containing unit 11' by means of a hinge structure 60. In the second embodiment of the invention, the container 11' is composed of conducting material which serves to transmit one side of the battery "line" to the casing 36' which is also of conducting material. The circuit to the lamp is thence completed to the socket 49'. The other side of the "line" from the dry cell 31' is completed through the contactor 29' and the conductor 50'. The hinge structure may include the decorative element 61 which for example is shown in the form of an eagle.

In the second embodiment, a transparent cover plate 44' serves to maintain the transparency 43' in position and the magnifying effect furnished by the lens 44 in the first embodiment is not utilized. The cover member 62 may be of any suitable material, preferably opaque, and the same is hingedly connected to one side of the rim 45'.

The mode of operation of the second embodiment is in many respects similar to the first embodiment, manual pressure on the convex head 27, serving to complete the circuit and illuminated transparency.

In the second embodiment of the invention, the insulating cylinder 23' is discontinuous, and an indentation 64 in the container 11 serves to properly position the forward end of the dry cell with relation to said container. The cap 18' is pivotally mounted by means of a hinge structure 65, and the lower edge thereof is provided with a tab 66, having a snap-like detachable engagement with the lower portion of the container 11'.

Turning now to the third embodiment of the invention illustrated in Figures 8 and 9, for the purpose of avoiding needless repetition, parts corresponding to the first embodiment are given doubly primed reference characters.

The third embodiment of the invention is designed principally for use upon a level surface such as a table, but by reason of its extreme portability, the same may be carried as a pocket piece. The container 11" is of irregular configuration as shown in Figures 8 and 9. The container 11" may be composed of a casting of any suitable insulated material. Where care is taken to insulate the "live" parts of the circuit, the container 11" may be composed of a conducting material. The lower portion of the container 11" includes a downwardly and outwardly extending flange 70, which serves principally to form a base and to add decoration to said container. The container 11" presents an open rear into which the dry cell 31" may be inserted transversely thereof. When inserted, the dry cell 31" is maintained in position by having one end thereof abut the shoulder 28", while the other end is adapted to be frictionally engaged by the contactor 33". The push button 26" action upon the contactor 29" serves to complete the circuit to the dry cell. The contactors 33" and 29" are preferably secured in place by means of rivets 71 and 72 which also maintain in position the conductor supports 50" and 51". These supports may have any desired shape, but preferably terminate in oppositely disposed inwardly projecting terminals 73 and 74. The inner ends of the terminals 73 and 74 are adapted to penetrate orifices 56" and 57" in the casing 36", and to engage in electrical contact the contact members 75 and 76. These in turn are connected to the socket 49" by means of the conductors 76 and 77.

The remaining parts of the transparency displaying unit 12" are substantially of the same construction as in the first embodiment.

It may thus be seen that in the use of the third embodiment, the display unit 12" may be rotated about the pivotal points formed by the terminals 73 and 74 so that an articulated relationship exists between said unit 12" and the container 11". Furthermore, by reason of the resilient construction of the conductor supports 50" and 51", the unit 12" may have substituted therefor any other unit containing a different transparency. The unit 12" is thus detachably engageable with the conductor supports 50" and 51". The device 10" therefore permits the use of a single base and cell and associated structure with a succession of different units 12" which may be readily engaged and disengaged to permit a plurality of different views to be illuminated.

I have disclosed a novel and useful transparency displaying and illuminating device which is especially suitable for personal use, and although highly useful and efficient, is capable of low cost and large scale production.

Features are provided which present ready replacing of the source of electrical energy as well as the transparency, and all forms of the invention permit an articulated motion of the display portion with relation to the power source for greater adaptability and usefulness as well as comfort.

I wish it to be understood that I do not desire to be limited to the exact details of construction shown and described for obvious modifications will occur to a person skilled in the art.

I claim:

A transparency displaying and illuminating device comprising: a power source; a container for said power source; garment attaching means on said container; a transparency displaying unit having an orifice; a light source in said transparency displaying unit; a flexible conductor connecting the power source and the light source, said conductor being attached at the upper end thereof to said container and at the lower end thereof penetrating the said orifice and an enlargement on said conductor greater in size than said orifice disposed within the transparency displaying unit and limiting movement of said unit downwardly away from said container.

GENEVA BANDY CHRISTENSEN.